US007698796B1

(12) United States Patent
Dowling et al.

(10) Patent No.: US 7,698,796 B1
(45) Date of Patent: Apr. 20, 2010

(54) METHOD OF REPLACING A DOOR CLOSURE

(76) Inventors: Michael T. Dowling, 18734 Wild Horse Creek Rd., Chesterfield, MO (US) 63005; William D. Johnson, 6689 FM 170, Rogersville, MO (US) 65742

( * ) Notice: Subject to any disclaimer, the term of this patent is extended or adjusted under 35 U.S.C. 154(b) by 0 days.

(21) Appl. No.: 12/105,062

(22) Filed: Apr. 17, 2008

Related U.S. Application Data

(62) Division of application No. 11/214,506, filed on Aug. 30, 2005.

(60) Provisional application No. 60/647,854, filed on Jan. 28, 2005.

(51) Int. Cl.
*B23P 19/04* (2006.01)

(52) U.S. Cl. .................................................. 29/402.08

(58) Field of Classification Search ............. 29/402.08, 29/402.01, 402.03, 402.06, 402.09, 402.11, 29/402.12, 402.15; 52/514, 391
See application file for complete search history.

(56) References Cited

U.S. PATENT DOCUMENTS

| | | | |
|---|---|---|---|
| 2,460,369 A | 2/1949 | Stonach | |
| 2,974,918 A | 3/1961 | Voigtlander | |
| 3,538,536 A * | 11/1970 | Pecorella | 16/16 |
| 3,805,395 A | 4/1974 | Hopkinson | |
| 4,086,681 A | 5/1978 | Nakanishi | |
| 4,304,027 A | 12/1981 | DiFazio | |
| 4,583,706 A | 4/1986 | Whitehouse et al. | |
| 4,687,165 A | 8/1987 | Blackburn | |
| 5,152,487 A | 10/1992 | Defatte et al. | |
| 5,347,724 A | 9/1994 | Hankins | |
| 5,357,725 A | 10/1994 | Ferry | |
| 5,392,562 A | 2/1995 | Carámbula | |
| 5,524,860 A | 6/1996 | Ives | |
| 5,673,490 A | 10/1997 | Hill | |
| 5,819,372 A | 10/1998 | Magoon | |
| 6,032,330 A | 3/2000 | Chen | |
| 6,205,615 B1 | 3/2001 | Jensen et al. | |
| 6,317,995 B1 | 11/2001 | Hoffmann, Sr. | |
| 6,317,996 B1 | 11/2001 | Myers et al. | |
| 6,374,505 B2 | 4/2002 | Myers et al. | |
| 6,430,834 B2 | 8/2002 | Myers et al. | |
| D463,728 S | 10/2002 | Johnson | |
| 6,510,619 B2 | 1/2003 | Mills | |

(Continued)

FOREIGN PATENT DOCUMENTS

| | | |
|---|---|---|
| DE | 3421498 | 6/1984 |

(Continued)

*Primary Examiner*—John C Hong
(74) *Attorney, Agent, or Firm*—Harness, Dickey & Pierce, P.L.C.

(57) ABSTRACT

A universal mounting plate for replacing a plurality of different door closers with a new door closer, the plate having a substantially flat rectangular body of a material thickness. A plurality of holes are formed through the material thickness and arranged in a plurality of patterns that correspond to the mounting hole patterns of a plurality of different door closers. The mounting plate can be attached to the door through existing mounting holes and the replacement closer attached to the mounting plate. The existing holes in the door are used to mount the plate and the plate is employed to mount the replacement closer, eliminating the need to drill new holes in the door and patching the old holes.

7 Claims, 3 Drawing Sheets

U.S. PATENT DOCUMENTS

| | | | |
|---|---|---|---|
| 6,634,059 | B2 | 10/2003 | Seiferd |
| 2002/0007563 | A1 | 1/2002 | Myers et al. |
| 2002/0007564 | A1 | 1/2002 | Myers et al. |
| 2003/0115767 | A1 | 6/2003 | Wedekind et al. |
| 2004/0098940 | A1 | 5/2004 | Latessa et al. |

FOREIGN PATENT DOCUMENTS

| | | |
|---|---|---|
| DE | 4038720 | 12/1990 |
| DE | 29516075 | 10/1995 |
| WO | WO0042281 | 7/2000 |

* cited by examiner

TABLE A

| LETTER CODE | MANUFACTURER | SERIES NUMBER |
|---|---|---|
| B | DESIGN HARDWARE | 316 |
| B | NORTON | 8100 |
| B | NORTON | 8300 |
| B | NORTON | 8500 |
| B | YALE | 3100 |
| B | YALE | 3300 |
| B | YALE | 3500 |
| B | DORMA | 8600 |
| B | DOR-O-MATIC | SC80 |
| E | LCN | 1460 |

TABLE B

| MANUFACTURER | SERIES NUMBER | LETTER CODE |
|---|---|---|
| YALE | 50 | G |
| YALE | 150 | G |
| DESIGN HARDWARE | 116 | G |
| NORTON | 1600 | G |
| DORMA | 7200 | G |
| DOR-O-MATIC | SC60 | G |
| RYOBL | 1650 | G |
| SARGENT | 1430 | D |
| CORBIN RUSSWIN | 3200 | H |
| CORBIN RUSSWIN | 3600 | H |

M = MOUNTING HOLES IF USED AS A STANDARD DROP PLATE

TABLE A

| LETTER CODE | MANUFACTURER | SERIES NUMBER |
|---|---|---|
| E | DESIGN HARDWARE | 316 |
| E | NORTON | 8100 |
| E | NORTON | 8300 |
| E | NORTON | 8500 |
| E | YALE | 3100 |
| E | YALE | 3300 |
| E | YALE | 3500 |
| E | DORMA | 8600 |
| E | DOR-O-MATIC | SC80 |
| D | LCN | 1460 |

TABLE B

| MANUFACTURER | SERIES NUMBER | LETTER CODE |
|---|---|---|
| YALE | 50 | A |
| YALE | 150 | A |
| DESIGN HARDWARE | 116 | A |
| NORTON | 1600 | A |
| DORMA | 7200 | A |
| DOR-O-MATIC | SC60 | A |
| RYOBL | 1650 | A |
| SARGENT | 1430 | B |
| CORBIN RUSSWIN | 3200 | C |
| CORBIN RUSSWIN | 3600 | C |

METHOD OF REPLACING A DOOR CLOSURE

CROSS REFERENCE TO RELATED APPLICATIONS

This application is a division of application Ser. No. 11/214,506, filed Aug. 30, 2005, which claims the benefit of provisional patent application Ser. No. 60/647,854, filed Jan. 28, 2005, both of which are incorporated herein by reference.

BACKGROUND OF THE INVENTION

Door closers must be installed at a certain position on the door and frame. The mounting holes must be in a specific location and pattern. Generally, there are three different mounting positions that are used.

Generally, the manufacturer of the door closer provides a template with the door closer that can be positioned on the door and frame. The template usually is made of paper and provides graphics that illustrate the location of the mounting holes.

In any event, the installer places the template on the frame and door, marks the position of the holes shown on the template and then drills mounting holes at the location indicated by the graphics. As can be appreciated, there are a number of manufacturers of door closers. Different manufacturers use different mounting hardware, which may have different hole mounting patterns. If the installer replaces a defective closer with a different model or brand, he must drill new holes in the door. If the door is wooden, the holes can be filled. Repairing holes in metal doors is more problematic. Either way, the installation of a different closer can result in unsightly marks on the door.

SUMMARY OF THE INVENTION

One aspect of the invention provides a plate that allows for installation of a replacement door closer without leaving unsightly patched holes in the door.

In one aspect of the invention, the plate is a substantially rectangular and includes a plurality of mounting holes, the plurality of mounting holes are arranged in patterns that correspond to mounting holes required for a plurality of different door closers.

Another aspect of the invention provides a universal mounting plate comprising a generally rectangular body having a first end and a second end, the body having a plurality of closer mounting holes formed therein, the plurality of closer mounting holes are arranged in patterns corresponding to mounting holes required for a plurality of different door closers. The mounting plate can be attached to the door utilizing existing holes drilled in the door. A replacement closer then is attached to the mounting plate.

Another aspect of the invention provides for a method of mounting a replacement door closer using a universal mounting plate having a substantially flat rectangular body of a material thickness with a plurality of holes formed through the material thickness and arranged in a plurality of patterns that correspond to the mounting hole patterns of a plurality of different door closers. The closer to be replaced is removed and the mounting plate is attached to the door through existing mounting holes that were drilled for the old closer. The replacement closer is attached to the mounting plate. The existing holes in the door are used to mount the plate and the plate is employed to mount the replacement closer, eliminating the need to drill new holes in the door and patching the old holes.

DETAILED DESCRIPTION OF THE INVENTION

A universal mounting plate of the present invention is primarily intended to be employed in the installation of door closers on metal doors so as to cover up any unsightly holes, particularly when there is a replacement installation of a door closer having different mounting holes than the door closer being replaced.

Figure 1:
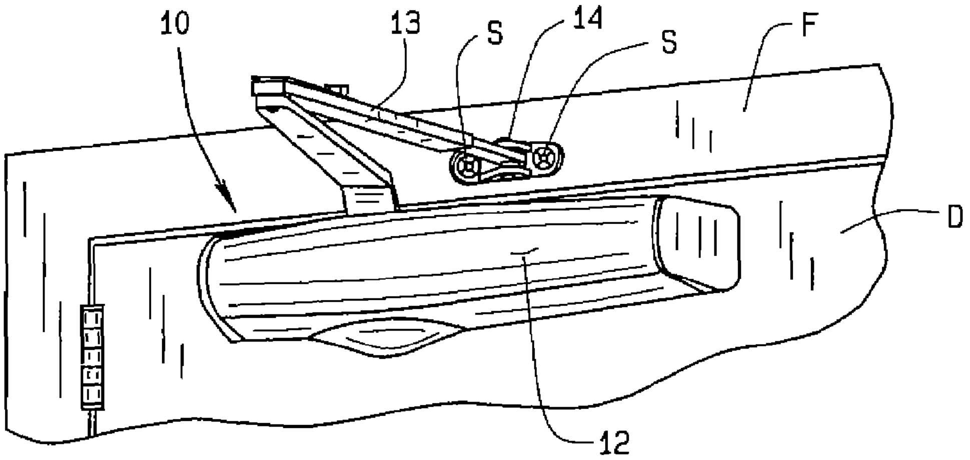
FIG. 1 is a perspective view of a door-mounted door closer.

A typical door closer assembly is indicated generally by reference numeral 10 in FIG. 1. Door closer assembly 10 comprises a door closer 12, an arm 13 and shoe bracket 14. The door closer 12 is mounted on the door D and the shoe bracket 14 is mounted on the doorframe F. The closer 12 is operably connected to the shoe bracket 14 by arm 13 and operates in a conventional manner understood in the art. Door closer 12 is mounted on door D by screws (not shown) and, likewise, bracket 14 is mounted on doorframe F with screws S. It will be understood by those skilled in the art that holes are drilled in the door and the doorframe to accommodate the mounting screws. To appropriately locate these holes, a template is employed.

Figure 2:
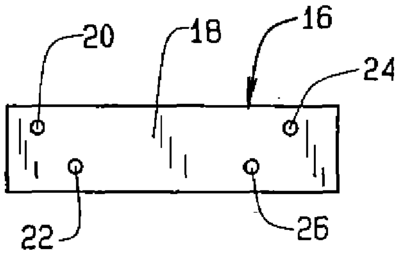
FIG. 2 is a front plan view of a magnetic template.
Figure 3:
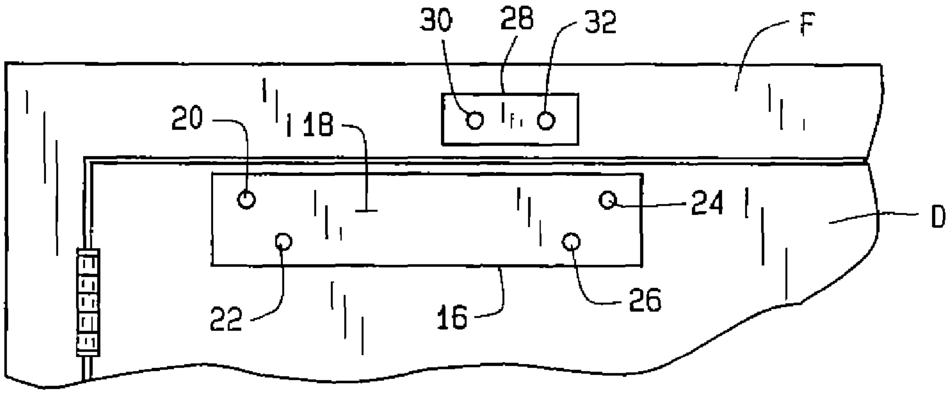
FIG. 3 is a perspective view of a door closer template of FIG. 2 on a door and a bracket template on a doorframe.

A door closer template is indicated generally by reference numeral 16 in FIGS. 2 and 3. Template 16 can comprise any useful shape, but in a preferred aspect of the invention it is rectangular. Template 16 has a peripheral configuration and dimensions roughly conforming to that of the door closer 12. However, template 16 can be of any useful size and configuration.

Template 16 has a flat external surface 18. At a minimum, surface 18 should bear marking indicia indicating the proper location for the mounting screws. In the illustrated template 16, these indicia include holes 20, 22, 24 and 26, that extend through the template and which conform to the location of mounting screw holes in the contact side of door closer 12.

As seen in FIG. 3, a bracket template 28 is positioned on the doorframe. Bracket template 28 generally is smaller than the door closer template 16 and has a general, peripheral configuration similar to bracket 14. In any event, template 28 can bear desirable indicia which include indicia for the proper location of holes for mounting screws S. In the illustrated embodiment, there are two indicia including holes 30 and 32.

In general, to install closer assembly 10, the installer determines the proper position of the closer and bracket on the door and frame. The closer template 16 is positioned on door D where the closer is to be mounted and the bracket template 28 is positioned on frame F where bracket 14 is to be mounted, as shown in FIG. 3. The installer then can mark the mounting holes by using a marker or pen to make marks on the door or frame through the template holes, e.g. holes 20-26 and holes 30 and 32. It will be understood that the installer, rather than marking the holes, can introduce a drill bit through holes 20-26 and 30 and 32 and drill the holes with the template still in place. The installer drills the holes and mounts the closer and bracket as conventionally understood.

Figures 4, 5:
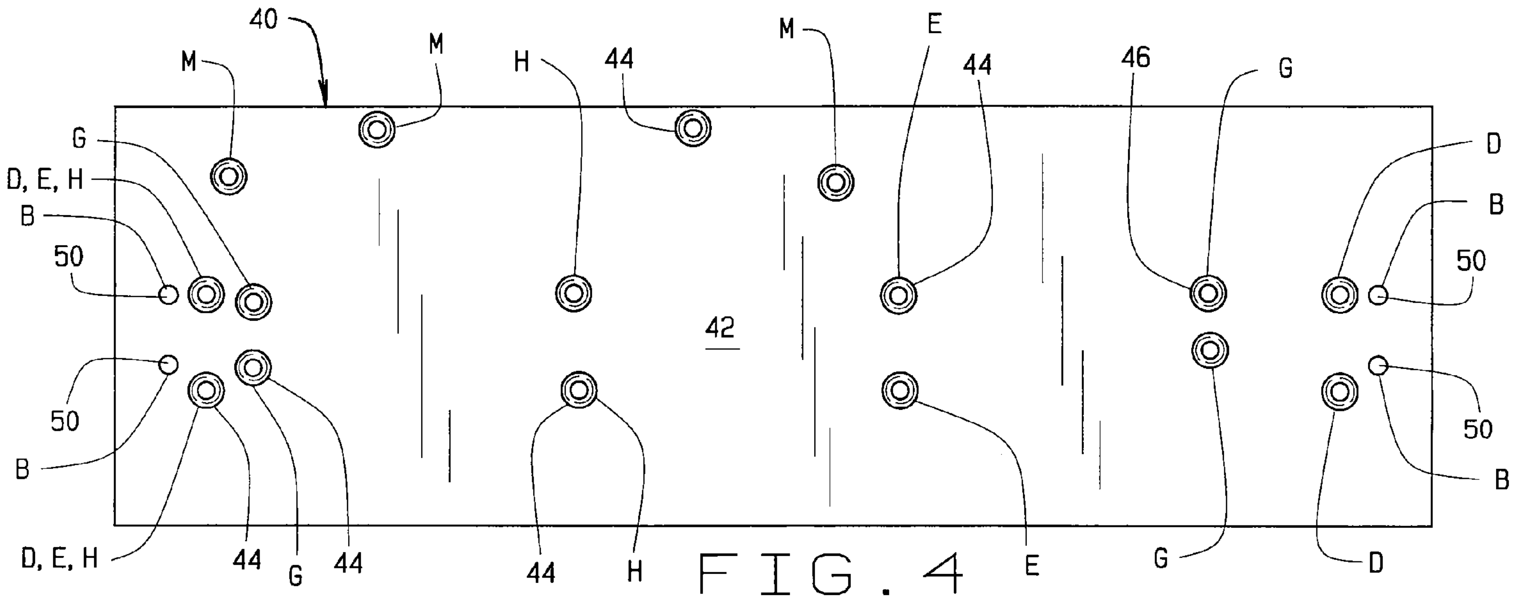
FIG. 4 is a top plan view of a universal mounting plate of the present invention.
FIG. 5 is a table of representative brands of popular closers that can be replaced using the universal mounting plate of FIG. 4.

As can be appreciated from the foregoing, to mount a door closer 12 on a door requires the installer to drill multiple holes in the door. However, if the closer goes bad or fails, it needs to be replaced. Since many of the major brands of door closers use different mounting holes, removal of the defective closer will leave holes in the door in a pattern of holes required to mount the defective closer. On a metal door it is difficult to cover up the old holes. On wood doors, the holes generally are patched with wood putty, which is time consuming and still leaves an unsightly appearance. The universal mounting plate, indicated generally by numeral 40 in FIG. 4 is employed to remedy this problem.

As can be seen, plate 40 has a generally flat, rectangular body 42 having a material thickness. In a preferred embodiment, plate 40 is constructed from relatively thick steel, for example sheet steel approximately 3/16 inch in material thickness. In the illustrated embodiment, a number of holes 44 are formed through the material thickness of body 42. The holes generally are drilled and tapped, resulting in a threaded inner surface 46. The holes can be formed without threads, if desired.

Figures 6, 7:
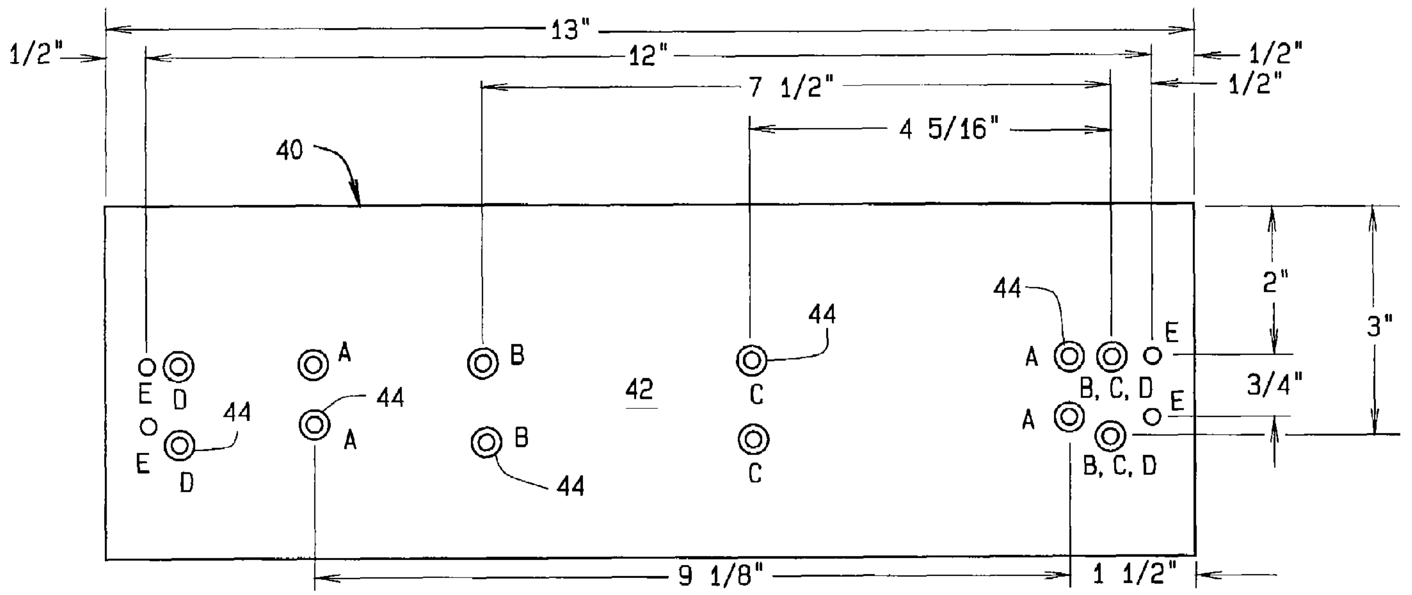
FIG. 6 is a top plan view of another aspect of a universal mounting plate of the present invention.
FIG. 7 is a table of representative brands of popular closers that can be replaced using the universal mounting plate of FIG. 6.

The holes 44 are arranged on plate 40 in a plurality of different configurations. Each of the plurality of configurations corresponds to the mounting hole pattern of a popular brand of door Tables A and B in FIG. 5, and include a representative listing of brands of closers having hole patterns that correspond to at least one hole pattern found in plate 40. FIGS. 6 and 7 illustrate another aspect of plate 40. The holes 44 are arranged on plate 40 in a plurality different configurations. Each of the plurality of different configurations corresponds to a mounting hole pattern of a popular brand of door closer. For purposes of illustration, various holes 44 in FIGS. 4 and 6 are labeled A through E, G and H. Tables A and B in FIGS. 5 and 7 identify the brand of closer requiring mounting hole patterns corresponding to a configuration of labeled holes in FIGS. 4 and 6, respectively. FIG. 6 also illustrates the horizontal dimension of an embodiment of plate 40 as well as the relative placement of the holes over the horizontal dimension. As can be appreciated by one skilled in the art, the companies included in Tables A and B of both FIGS. 5 and 7 represent many of the commercially available door closers. However, the utility of the present invention is not limited to the listed companies. Other hole patterns can be formed in plate 40, if necessary.

In any event, plate 40 is attached to the door by using appropriate attachment apparatus, one example being screws placed through the appropriate pattern of holes 44 and the aligned holes already drilled in the door. Once plate 40 is mounted to the door, the closer 12 can be attached to the plate by using screws provided with the plate. For example, the replacement closer can be attached to the plate at holes 50 in plate 40, with provided screws.

Alternatively, if the holes 44 are not threaded, a bolt or similar apparatus can be inserted through the holes and through the door and fastened on the opposite side, for example by a nut.

By way of example, referring to FIGS. 4 and 5, if the closer to be replaced is a Norton brand, plate 40 is attached to the door by using plate mounting screws introduced through the pattern of holes 44 that correspond to the mounting holes drilled in the door in a pattern to accommodate mounting of the removed Norton closer. The replacement closer is attached to plate 40 utilizing a pattern of tapped threaded holes in plate 40 that accommodate the replacement closer, as mentioned above. Hence, the replacement closer can be used to replace any other brand of closer, without having to drill new holes in the door that correspond to the mounting hole pattern of the replacement closer.

The universal mounting plate of the present invention can be provided as part of a door closer replacement kit including, at a minimum, a replacement door closer, a universal mounting plate, and attachment apparatus for attaching the universal mounting plate to the door. The kit could include mounting templates, attachment apparatus for attaching the replacement door closer to the universal mounting plate, or any other required apparatus or materials.

One skilled in the art will recognize that various changes and modifications can be made in the universal door closer mounting plate of the present invention without departing from the scope of the appended claims. The drawing figures and tables of brands of closers are intended to be illustrative and should not be construed in a limiting sense.

The invention claimed is:

1. A method of replacing a door closer mounted on a door with a replacement door closer mounted on the door, the method comprising:

removing the door closer being replaced from the door to expose a plurality of mounting holes in the door arranged in a mounting hole pattern required for mounting the door closer being replaced;

placing a universal mounting plate on the door, said universal mounting plate having a substantially flat body with a plurality of substantially circular mounting holes asymmetrically positioned across the body, said plurality of mounting holes comprised of a plurality of predetermined mounting hole patterns, said plurality of predetermined mounting hole patterns comprising at least a first pattern corresponding to the mounting hole pattern required for mounting the door closer being replaced, and a second pattern, different from the first pattern, corresponding to the mounting holes required for mounting the replacement door closer;

aligning the holes first pattern of holes in the universal mounting plate with the plurality of mounting holes in the door;

attaching the universal mounting plate to the door with attachment apparatus through the aligned holes in the universal mounting plate and in the door; and attaching a replacement door closer to the attached universal mounting plate using the holes of the second pattern of mounting holes in the universal mounting plate.

2. The method of claim 1 wherein the step of attaching the universal mounting plate to the door with attachment apparatus through the aligned holes in the universal mounting plate and the door further comprises attaching the universal mounting plate to the door with screws or bolts.

3. The method of claim 1 wherein the the universal mounting plate placed on the door comprises a generally rectangular body having a material thickness, and a first end and a second end, said first end having at least one closer attachment hole of the second pattern therein and said second end having at least one closer attachment hole of the second pattern therein for the attachment of the replacement closer to the universal mounting plate.

4. The method of claim 3 wherein the step of attaching a replacement door closer to the attached universal mounting plate further comprises attaching the replacement door opener to the universal mounting plate by using attachment apparatus to attach the replacement door opener to the at least one closer attachment hole in the first end of the rectangular body and to the at least one closer attachment hole in the second end of the rectangular body.

5. A method of mounting a replacement door closer on a door comprising:

removing a door closer to be replaced from a door and exposing a symmetrical pattern of mounting holes therein that was used to mount the door closer that is being replaced;

placing a universal mounting plate on the door, said universal mounting plate having a substantially flat body with plurality of circular plate mounting holes asymmetrically positioned therein, said plurality of circular plate mounting holes arranged in at least six different predetermined mounting hole patterns each comprised of symmetrically positioned circular plate mounting holes, including at least a first predetermined mounting hole pattern corresponding to the exposed symmetrical pattern of mounting holes in the door, and a second predetermined mounting hole pattern, different from the first pattern, corresponding to the mounting holes required for mounting the replacement door closer;

aligning the holes of the first predetermined mounting hole pattern with the holes of the exposed pattern of mounting holes in the door;

attaching the universal mounting plate to the door with attachment apparatus through the aligned holes of the first predetermined pattern of mounting holes in the universal mounting plate and the holes in the door; and attaching the replacement door closer to the attached universal mounting plate using the second predetermined pattern of mounting holes.

6. The method of claim 5 wherein the step of attaching the universal mounting plate to the door with attachment apparatus through the aligned holes in the universal mounting plate and the door further comprises attaching the universal mounting plate to the door with screws.

7. The method of claim 5 wherein the universal mounting plate placed on the door comprises a generally rectangular body having a material thickness, a first end and a second end, said first end having at least one closer attachment hole therein and said second end having at least one closer attachment hole therein for attachment of a replacement closer to the plate, the step of attaching a replacement door closer to the attached universal mounting plate further comprising attaching a replacement door closer to the attached universal mounting plate with attachment apparatus at the at least one closer attachment hole at the first end of the rectangular body and with attachment apparatus at the at least one closer attachment hole at the second end of the rectangular body.

* * * * *